Aug. 26, 1969          G. F. SKALA                    3,463,589
            PORTABLE CONDENSATION NUCLEI DETECTOR
Filed Jan. 27, 1966                              5 Sheets-Sheet 1
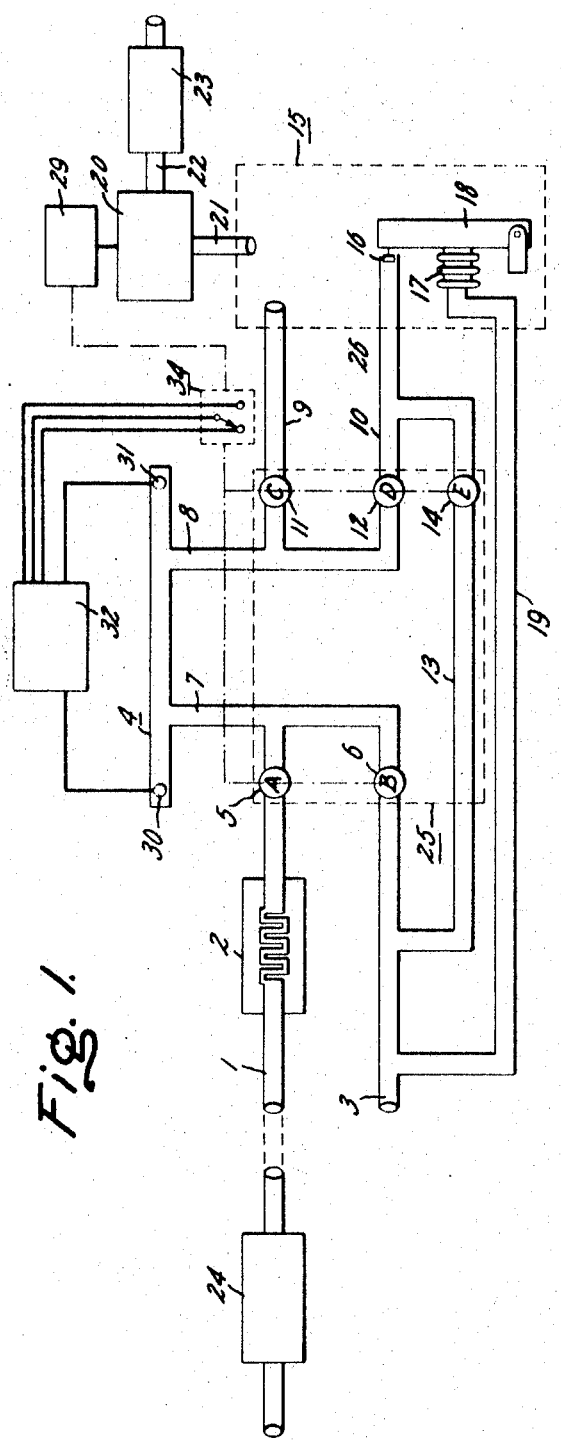
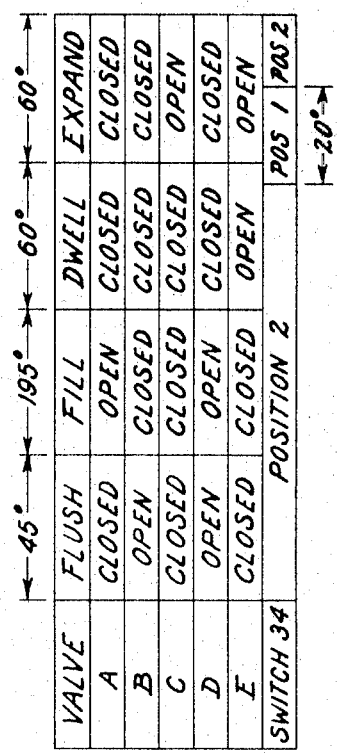
Inventor:
George F. Skala,
by Charles W. Helzer
His Attorney.

Aug. 26, 1969  G. F. SKALA  3,463,589
PORTABLE CONDENSATION NUCLEI DETECTOR
Filed Jan. 27, 1966  5 Sheets-Sheet 2

Inventor:
George F. Skala,
by Charles W Helzer
His Attorney.

Aug. 26, 1969    G. F. SKALA    3,463,589
PORTABLE CONDENSATION NUCLEI DETECTOR
Filed Jan. 27, 1966    5 Sheets-Sheet 3

Inventor:
George F. Skala,
by Charles W Helzer
His Attorney.

United States Patent Office 3,463,589
Patented Aug. 26, 1969

3,463,589
PORTABLE CONDENSATION NUCLEI DETECTOR
George F. Skala, Scotia, N.Y., assignor to General
Electric Company, a corporation of New York
Filed Jan. 27, 1966, Ser. No. 523,338
Int. Cl. G02b 21/00
U.S. Cl. 356—37   7 Claims

ABSTRACT OF THE DISCLOSURE

This invention relates to a continuously operating condensation nuclei detector which is portable to the extent that it may be carried by a human being. The expansion chamber of this invention utilizes the principle of attenuation of a light beam to a photocell, eliminating the need for special dark field optical systems, and thereby providing the advantages of very simple optics and simple photocell pickup while at the same time enabling the use of a smaller power supply than was the case in prior expansion chambers.

---

Condensation nuclei is a generic name given to small particles which are characterized by the fact that they serve as the nuclei on which a fluid, such as water for example, condenses to form droplet clouds. Condensation nuclei, as this term is understood in the art, encompasses particles ranging in size from $1 \times 10^{-4}$ cm. radius to $1 \times 10^{-8}$ radius, although the most significant portion, numerically, of this range lies between $5 \times 10^{-5}$ and $5 \times 10^{-7}$ cm. radius.

In recent years extensive investigations into the composition, behavior, and properties of condensation nuclei have shown that they may provide a very simple yet accurate index of conditions in many technological and scientific areas. Thus, for example, accurate information about condensation nuclei concentrations is extremely useful in meteorological and atmospheric studies, air pollution studies, and investigations of many common industrial processes. It has been found that many application areas for continuously operable condensation nuclei detectors are in remote locations which are relatively inaccessible. It was therefor desirable to develop a portable condensation nuclei detector for use in such remote locations. For example, such a portable condensation nuclei detector would be extremely useful in air pollution studies wherein it is desired to know the concentration of nuclei particles in the atmosphere at various remote locations. Of course to be portable, the condensation nuclei detector must be physically small and require a low power supply.

The general scheme that is used in most practical condensation nuclei detectors involves humidifying a gaseous sample to one hundred percent relative humidity and then introducing the sample into an expansion chamber by means of a valve arrangement. The samples in the chamber then are periodically and rapidly expanded by means of a vacuum pump and vacuum pressure regulator to cool the air in the chamber and cause it to become supersaturated. In this condition of supersaturation, water vapor condenses on the condensation nuclei present in the gaseous medium thereby physically enlarging the radius of the particles. At one end of the expansion chamber a light source is placed which directs a beam of radiant energy through the gaseous sample to the other end of the chamber where a light sensitive element monitors the light. Enlarged condensation nuclei scatter the light passing through the chamber thereby changing the output of the light sensitive element. An electrical signal proportional to this output change is translated into a meter output reading of the nuclei concentration present in the gaseous sample.

Although condensation nuclei detectors using the general scheme described above, have been developed employing various types of humidifiers, valving arrangements, expansion chambers, and electrical pickup techniques, the problems involved in combining these components into a compact and continuously operating portable detector necessitated the development of more efficient components and arrangements. To this end, the various components must be relatively small in physical size and must be devoid of complex parts requiring delicate or extensive maintenance and care. Also, the power consumption of the moving mechanical parts and the electrical circuit must be kept to a minimum. Finally the detector must be durable and must operate in any position and environment likely to be encountered when carried as a portable unit.

It is therefore an object of this invention to provide an apparatus for a detecting condensation nuclei which is portable and which is continuously operable.

It is another object of this invention to provide a condensation nuclei detector which is constructed so as to be jostled about without hampering its operation.

It is a specific object of this invention to provide a gas humidifier for a condensation nuclei detector which is operable in any and all positions.

It is another specific object of this invention to provide a condensation nuclei detector employing a flow system and valving arrangement which is relatively small in physical size and which requires less extensive maintenance and energy consumption than has heretofore been achieved.

It is still another specific object of this invention to provide a condensation nuclei detector employing an expansion chamber which is efficient yet relatively small and less complicated in structure than has been utilized before.

It is yet another specific object of this invention to provide an optical detecting system and electrical control circuit for a condensation nuclei detector which provides reliable and accurate readings of nuclei concentration.

Briefly these objects are obtained in a condensation nuclei detector including a valving arrangement and flow system in which a gaseous sample passes through the humidifier into the expansion chamber only during a relatively small portion of a cycle while during the remainder of the cycle clean, ambient air bypasses the humidifier and flows through the expansion chamber thereby continuously cleaning and drying the inside of the expansion chamber and reducing to a minimum any harmful effects on the humidifier that may occur due to any corrosive vapors present in the gaseous sample. The humidifier itself is a self-contained sealed unit in which capillary water passages connect a reservoir of water to the air flow in any position of the humidifier so that the humidifying action may take place in any position of the portable condensation nuclei detector. The expansion chamber comprises an enclosed tubular member with polished walls that conduct light from a source at one end of the chamber to a light sensitive element at the other end of the chamber without necessitating the use of lenses or other optical elements. The electrical control circuit for the electro-optical system provides a means for storing the electrical signal indication of the nuclei concentration of a previous sample and then adjusting this stored indication according to the next subsequent signal to provide continuous monitoring. Also by a self-balancing of the optical system between each reading, all successive readings are based on a common reference.

These objects and other advantages of my invention will be apparent to one skilled in the art after reference is made to the following description of a preferred embodiment of my invention when taken in connection with the accompanying drawings in which:

FIG. 1 shows a flow control system according to the present invention,

FIG. 2 shows a cycling diagram for the flow control system of FIG. 1,

Figure 3:
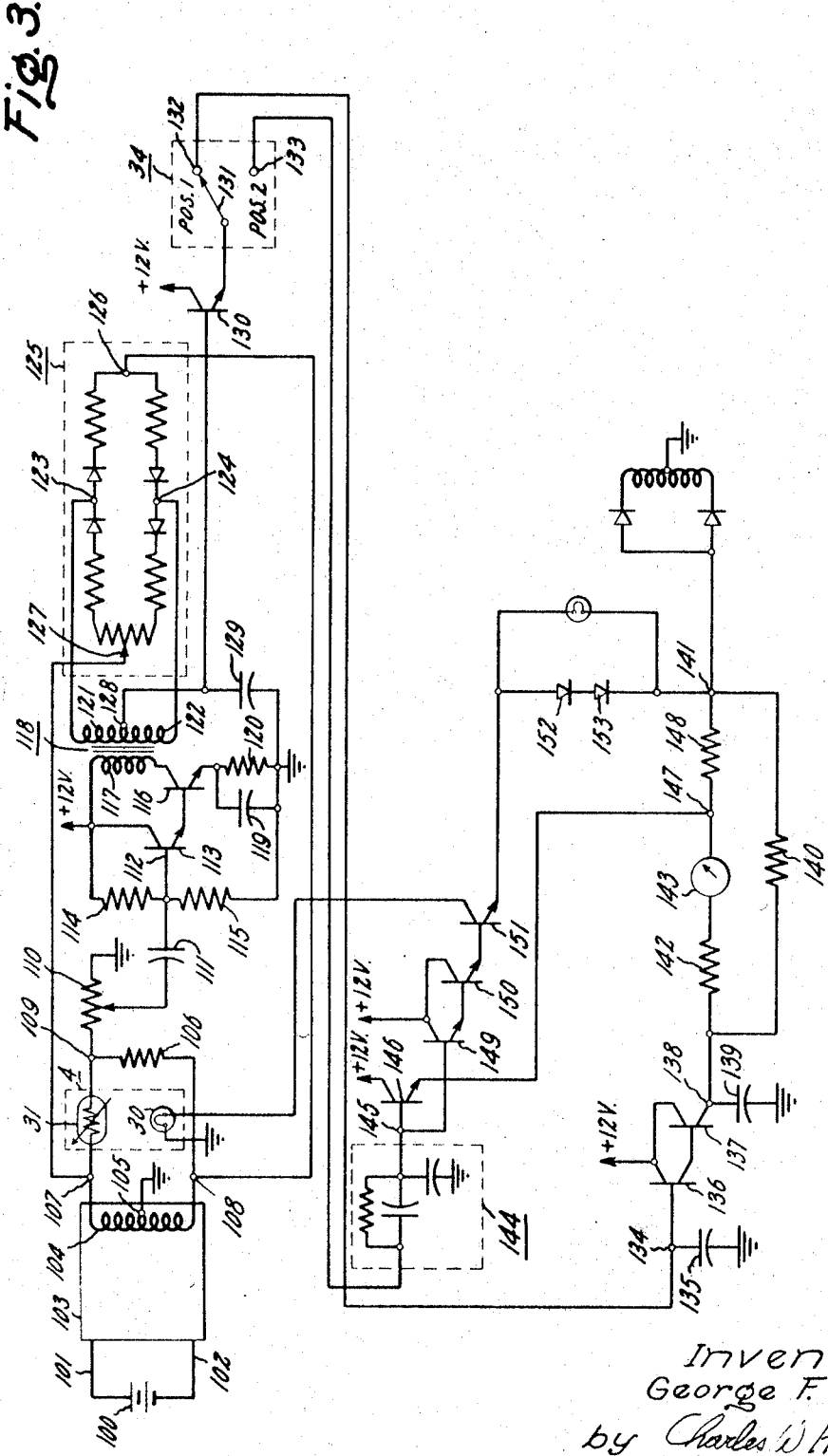
Figure 4:
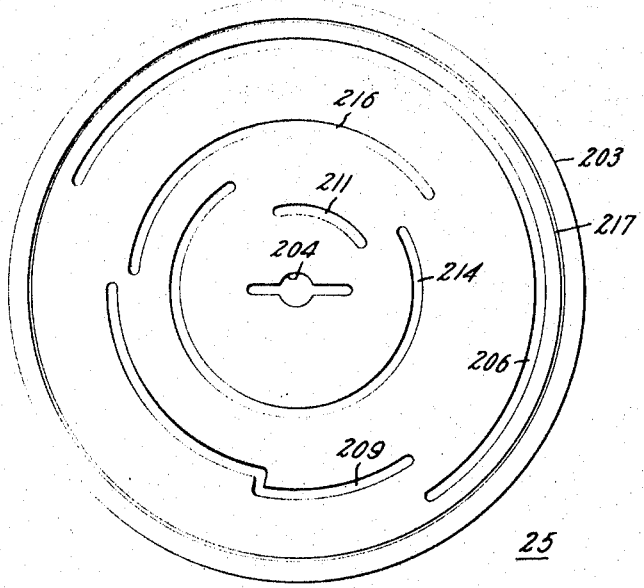
Figure 5:
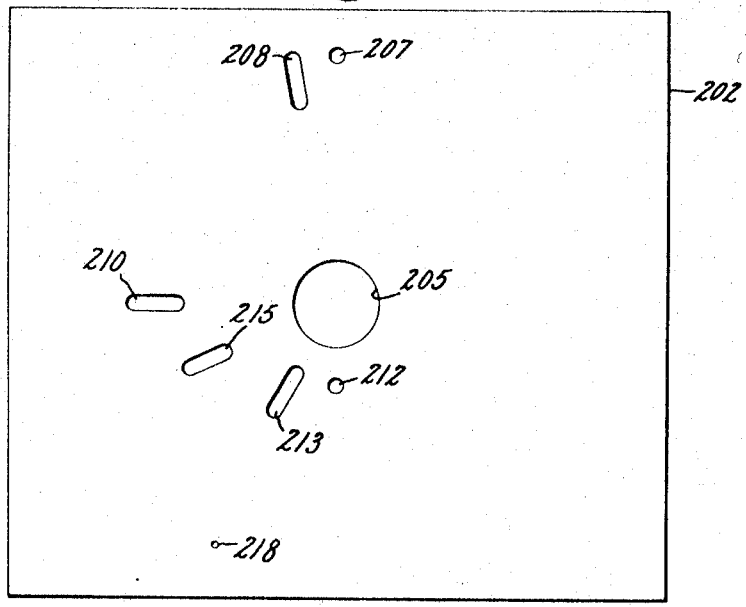
Figure 6:
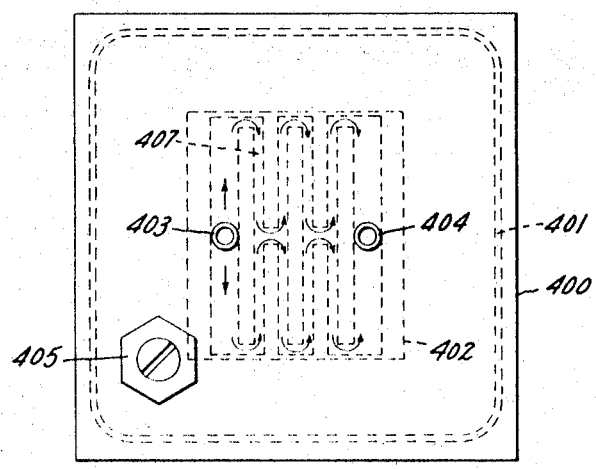
Figure 7:
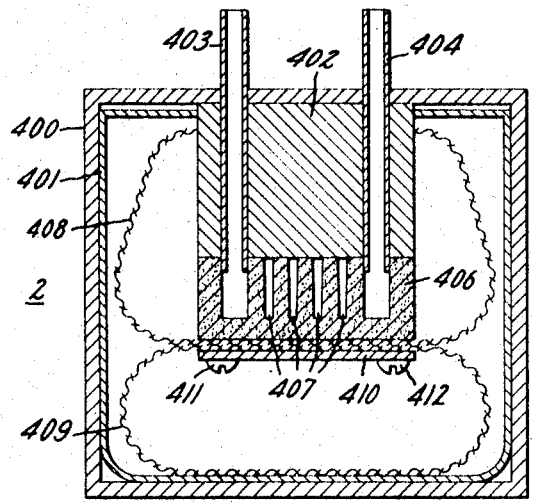
Figure 8:
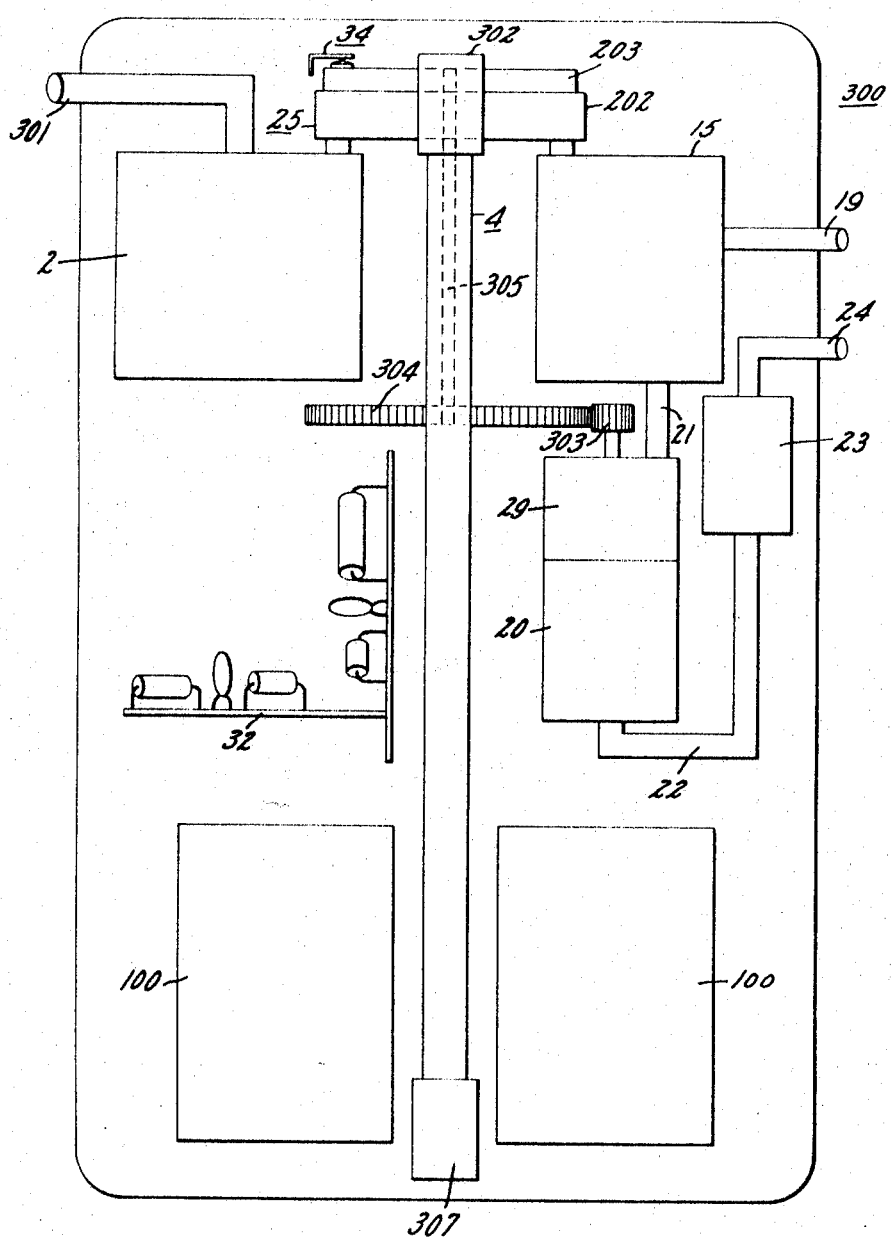

FIG. 3 is a circuit diagram which provides air control and readout for the system of FIG. 1, FIGS. 4 and 5 illustrate a specific valve means adapted to be utilized in the system of FIG. 1, FIGS. 6 and 7 illustrate a specific humidifying means adapted to be utilized in the system of FIG. 1, and FIG. 8 illustrates the physical arrangement of the various components of the system of FIG. 1 in a portable casing.

Referring now to FIG. 1, there is shown a functional block diagram of a portable condensation nuclei detector constructed in accordance with the present invention. In FIG. 1 a gas sample containing the nuclei concentration to be measured, enters an intake conduit 1 and is passed into a humidifier designated generally with reference 2 to be described in greater detail in connection with FIG. 7. The system shown in FIG. 1 permits the use of a converter 24 attached to the conduit 1 ahead of the humidifier 2. The converter 24 is used when it is desired to detect a certain gas, e.g., ammonia, and functions to convert the gas to be detected into condensation nuclei. The conversion may be carried out by an acid-base reaction which may involve corrosive vapors such as hydrochloric acid. Since these corrosive vapors may cause damage to the humidifier 2 and to the other components of the detector in contact with the air flow, it is desired to reduce to a minimum the flow of these corrosive vapors through these components.

For the above reason, the humidifier 2 is bypassed by means of another conduit 3, which is open to ambient air and therefore does not contain corrosive vapors. A valve 5, designated with a letter A, is positioned in conduit 1 between the humidifier 2 and an expansion chamber 4. Another valve 6, designated with the letter B, is connected in conduit 3. The valves A and B are mechanically coupled in a valving arrangement 25 so that they open and close in a fixed relationship with each other according to a cycling diagram which will be more fully explained hereinafter. The valving arrangement 25 couples both the valves 5 and 6 to an input conduit 7 leading to the expansion chamber 4. The mechanical linkage in the valve 25 between the two valves 5 and 6 is such that valve A is closed for the major portion of a cycle of the condensation nuclei detector and is open only during the necessary periods when humidified air passes into the expansion chamber 4. At all other times in the cycle the valve B is open so that clean dry air may be admitted into the expansion chamber 4.

After expansion, gaseous samples in the expansion chamber 4 exit by means of an outlet conduit 8 which is connected to a pair of conduits 9 and 10 each of which include a valve 11 and 12 respectively. The valves 11 and 12, designated by the letters C and D respectively, are part of the valving means 25 and are mechanically linked to open and close in accordance with the cycling chart of FIG. 2 which will be explained. A conduit 13 is connected to the conduit 3 ahead of the valve 6 and includes a valve 14, designated E, which is mechanically linked in the valving means 25 to the valves 5, 6, 11 and 12. On the other side of the valve 14 the conduit 13 connects to the section of conduit 10 on the outlet side of the valve 12. Conduits 13 and 10 extend by means of a conduit 26 into a vacuum pressure regulator designated generally by the reference numeral 15. The conduit 26 forms a bleed line for the vacuum regulator 15 and is provided with a variable orifice outlet 16 within the vacuum regulator 15 to regulate the degree of vacuum therewithin. The size of the orifice 16 is determined by a bellows 17 and linkage 18. The conduit 9 also extends into the vacuum regulator 15. A conduit 19 is connected to the ambient air inlet portion of the conduit 3 and extends into the interior of the bellows 17 to establish a pressure reference. The bellows, linkage, and variable orifice are set so that a constant, predetermined vacuum level exists in the interior of the vacuum regulator. A motor 29 drives a vacuum pump 20 which is connected to the vacuum regulator 15 by means of an intake conduit 21 and includes an exhaust conduit 22. A muffler 23 may be connected to the exhaust 22 in order to decrease the noise level of the motor and pump discharge. The motor 29 also drives the valving means 25 at a predetermined cycle rate. In a preferred embodiment the motor is set to operate at a speed such that the condensation nuclei detector cycles once per second. The motor 29 may be powered by a battery which may be, for example, a 12 volt type B battery.

The structural organization and the operation of the vacuum regulator 15 and its associated components such as the bellows 17, the plunger arm 18, and the variable orifice 16 are entirely conventional and therefore further detailed description of it is deemed unnecessary. In keeping with the portable nature of the condensation nuclei detector of this invention, however, it is to be desired that the particular components of the vacuum regulator 15 and the vacuum pump 20 be chosen with the primary consideration being that they have small physical size and weight. Although the specific vacuum regulator and pump utilized in this invention do not form a part of this invention, it should be noted that by means of the novel flow system disclosed hereinafter, the vacuum bleed for the regulator during the flush and fill portions of the cycle aid in maintaining the air flow through the expansion chamber 4 thereby enabling a smaller and more portable vacuum pump to be employed. In addition this feature allows the use of a smaller less powerful motor and power supply.

A light source 30 positioned at the left end of the expansion chamber 4 produces a beam of light which is reflected by the inner surface of the expansion chamber 4 to its other end where it is picked up by a light sensitive element 31 such as a photocell. The light source 30 and the photocell 31 are electrically connected to an amplifying and control circuit arrangement designated generally with the reference numeral 32 wherein an electrical signal is generated proportional to the degree of light scattering through the chamber.

While the operation of the flow system of FIG. 1 will be described in greater detail hereinafter, suffice it to say for the present that during one portion of a cycle, a humidified gaseous sample is introduced into the expansion chamber 4 and becomes supersaturated by causing it to expand into the vacuum developed by the vacuum regulator 15. In the supersaturated state water particles condense around the condensation nuclei present in the sample thereby increasing their radius and cause scattering of radiant energy passing through the chamber. The concentration level of condensation nuclei in the chamber 4 determines the amount of scattering and thus appears as an electrical signal at the output of the electrical circuit 32.

In addition to the expansion portion of the cycle the flow cycle of the system of FIG. 1 includes a portion during which the expansion chamber 4 becomes filled with a gaseous sample, another portion in which the gaseous sample is flushed out of the expansion chamber after the nuclei concentration has been measured, and another dwell portion during which time the vacuum regulator 15 may readjust itself to the proper degree of vacuum and the electrical circuit 32 may provide a reading of the previous sample and reset itself for another sample. During the flush, fill, and the major part of the dwell portion of the cycle, a double throw electric switch 34, electrically connected to the electrical control circuit 32, is in its position 2. However, during a brief portion of the cycle overlapping a latter part of the dwell portion and the first part of the expand portion the double throw switch 34 is in its position 1. Switch 34 is again in position 2 during the remainder of the expand portion. When the switch 34 is in position 2 the control circuit 32 adjusts itself so that successive readings are all relative to a predetermined reference level; but when the switch 34 is in its position 1 the circuit 32 takes a reading of nuclei concentration within the chamber 4. The motor 29 may be linked to the switch 34 to operate it at the proper times during the cycle.

FIG. 2 illustrates the flow cycle for the flow control system shown in FIG. 1. In FIG. 2 it is seen that the cycle consists of the successive periods of flush, fill, dwell, and expand. In one embodiment the flush period extends for 45° of a 360° cycle while the fill portion extends for 195°, the dwell for 60°, and the expand for 60°. These relative lengths of time in the complete 360° cycle are preferred in one embodiment of applicant's invention; however, the particular lengths of time disclosed in this embodiment are not essential to the general operation of this invention. It is therefore not intended to be limited to these particular periods.

In order to describe the operation of the flow control system of FIG. 1 in detail, it will be helpful to pick a starting point in the cycle at which time the conditions of the various valves and the electrical switch are known. For this purpose it is assumed that the cycle is in the flush portion and a gas sample, which has just been expanded and measured, is being flushed out of the expansion chamber. During the flush portion only the valve B and the valve D are open so that an air flow through the expansion chamber 4 and the conduits 3, 10 and 26 is maintained by the vacuum pump 20. This air flow flushes the chamber 4 with relatively dry ambient air thereby drying the inside of the chamber and ridding the chamber of the nuclei present in the previous gas sample analyzed. The air flowing through the conduit 26 during the flush portion is also used as a vacuum bleed for the vacuum chamber 15 thereby conserving the energy output of the pump 20. The gaseous sample containing the condensation nuclei is flushed through the vacuum bleed line 26 and emerges through the variable orifice 16 into the vacuum regulator 15. From here the sample is pumped out by the vacuum pump 20 through the exhaust pipe 22 and the muffler 23.

After the flush portion of the cycle is completed the valving means 25 operates such that the valve A opens while the valve B closes thereby switching the intake of air flow from the dry air conduit 3 to the humidified air conduit 1. During the fill portion of the cycle the valves C and E remain closed and the valve D remains open just as during the flush cycle just completed. The air entering the humidifier 2 through the intake conduit 1 may be atmospheric air or may be air emerging from the converter 24. In either case the gaseous sample entering the humidifier 2 contains condensation nuclei the concentration of which is to be determined. Within the humidifier 2 the conduit 1 is made serpentine so that its inside surface area is at a maximum. While the humidifier 2 will be explained in greater detail hereinafter in connection with FIG. 7, in its general operation the inside surfaces of the conduit 1 are kept wet due to the fact that they are connected to a water reservoir. Water vapor continuously evaporates into the air flow passing through the humidifier so that by the time it emerges its water vapor content has been increased to 100% relative humidity. In this state the gaseous sample passes through the open valve A and through the intake conduit 7 into the expansion chamber 4. During the fill portion the air flow is maintained by means of the vacuum pump 20 and also serves as a vacuum bleed for the vacuum regulator 15 in a manner similar to the flush portion as just described. The fill portion of the cycle is maintained for a suitable period until it is assured that the expansion chamber is completely filled with a gas sample desired to be measured. At this time the valving means 25 switches the system into its dwell portion during which all of the valves that have been previously open are closed so that no air flow through the expansion chamber 4 can exist. This effectively traps the gas sampler under measurement within the expansion chamber 4. During the dwell portion of the cycle the vacuum regulator 15 maintains the predetermined level of vacuum by means of a vacuum bleed through the conduits 26 and 13 and the valve 14. As can be seen in FIG. 2 the valve E opens during the dwell portion to provide the bleed source.

During most of the dwell portion of the cycle the electric control circuit 32 is in its reset state since the switch 34 is in its position 2. The operation of the electric circuit 32 and the control thereover by the switch 34 will be explained in greater detail hereinafter. At a predetermined time in the cycle just prior to the end of the dwell portion of the cycle the switch 34 is thrown into its position 1 by means of the mechanical linkage between this switch and the motor 29. In position 1 the electric circuit 32 measures the concentration of nuclei within the expansion chamber 4. Shortly after the switch 34 is thrown into its position 1 the valving means 25 switches the flow system into its expand portion wherein the valve C is opened. The gaseous sample trapped in the expansion chamber 4 is now exposed to a predetermined level of vacuum in the regulator 15 and an immediate expansion due to the immediate decrease in pressure results. The expanding gases within the chamber 4 cause the sample to become supersaturated and condensation of water particles on the nuclei immediately takes place. As water particles begin to condense on the condensation nuclei within the chamber 4, the radius of the particles increases until they have reached a size such that they begin to scatter light. The photocell 31 becomes darker as the condensation nuclei size increases thereby creating an electrical signal in the control circuit 32 which is transformed into a reading proportional to the concentration of condensation nuclei within the expansion chamber 4. Condensation within the expansion chamber will begin to increase to a peak level after which the water begins to evaporate from the condensation nuclei. The rate of condensation is determined entirely by the amount of expansion and, since this degree of expansion can be precisely controlled, this rate of condensation can likewise be precisely controlled. This means that the peak in condensation can be predicted and can be controlled so that it occurs at a preset time in the expansion portion of the cycle. In order to provide continuous monitoring of nuclei concentration, successive peak readings are stored in the electric circuit 32 and are used to continuously vary an indicating meter. The motor 29 is mechanically linked to the switch 34 such that at this precise time of peak condensation in the expansion chamber 4, the switch 34 is thrown back into its position 2 so that the reading taken by the circuit 32 will be a peak signal reading.

During the expansion portion of the cycle a vacuum bleed for the pressure regulator is maintained by the valve 14 being open, exactly in the same manner as during the dwell portion of the cycle. After the expand portion of the cycle is completed the valving means 25 switches the flow system to its flush portion and the flow system has completed one cycle.

In summary in the operation of the system the expansion chamber is flushed with unhumidified ambient air and is then filled with humidified air containing condensation nuclei, both flush and fill portions of the cycle being maintained by a vacuum bleed line for the vacuum regulator 15. After the expansion chamber is filled all of the valves are closed, with the exception of an auxiliary vacuum regulator bleed line valve, so that the sample becomes trapped in the expansion chamber 4. Just prior to the expansion period the electric circuit 32 is switched from its reset state into its measuring state. The sample in the chamber then expands into a lower pressure maintained by the vacuum regulator allowing water particles to condense on suspended nuclei thereby scattering light that normally impinges on a photocell. This results in attenuation of light reaching the photocell, and at a peak level that indicates the concentration level of nuclei in the sample, the electric circuit switches back into its reset state. Successive peak readings are used to vary a meter to provide continuous monitoring. By means of this flow system the air flow through the humidifier occurs only during the fill portion of the cycle so that corrosion and deposits in the humidifier and expansion chamber due to acid vapors are minimized.

Referring now to FIG. 3 the electrical control circuit 32 is shown in circuit diagram form. In this circuit the power supply is provided by means of a battery 100 which may be conveniently 12 volts. Such a battery is relatively small in size and is readily adapted to be placed within the portable condensation nuclei detector of the present invention. Input terminals 101 and 102 connect the battery to a conventional DC to AC inverter circuit represented in block form by the reference numeral 103. The inverter circuit 103 may be of any conventional form and may include an output transformer secondary winding 104 across which the alternating current electrical output appears. The output may be of any convenient voltage and frequency, but in accordance with the preferred embodiment of applicant's invention the output comprises a square wave at a frequency of three kilocycles and at a voltage magnitude of 120 volts peak to peak. The secondary winding 104 has a center tap 105 connected to ground so that the winding 104 is effectively divided into two sections. A series circuit comprising the photocell 131 and a resistor 106 is connected across the output terminals 107 and 108 of the secondary winding 104. The two sections of the secondary winding 104 together with the photocell 31 and the resistor 106 form four legs of a bridge network the output of which is dependent upon the resistance of, and therefore the amount of light impinging upon, the photocell 31. The output of this bridge circuit appears at a terminal 109 and is applied through a gain control potentiometer 110 and an input coupling capacitor 111 to the input base electrode 112 of a two stage amplifier comprised by transistors 113 and 116. In normal conditions the bridge circuit is balanced so that no signal appears at the output terminal 109. However, should the photocell become darkened due to attenuation of light impinging thereon from the lamp 30, an output signal appears at the terminal 109. The bias on the amplifying transistor 113 is set by a pair of voltage dividing resistors 114 and 115 connected between the 12 volt source and ground. The output of the transistor 113 is coupled to the input of a second amplifying transistor 116, and the output of this transistor appears across the primary winding 117 of an output transformer 118. The collector power for both the transistors 113 and 116 is supplied by the 12 volt source. A parallal combination of a capacitor 119 and biasing resistor 120 are connected between the emitter of the transistor 116 and ground.

The secondary of the output transformer 118 comprises a pair of series connected windings 121 and 122. The output signal appearing across the secondary windings of the transformer 118 is applied across the input terminals 123 and 124 of a ring demodulator represented generally by the reference numeral 125. A reference signal for the ring demodulator 125 is taken from the output terminals 107 and 108 of the DC–AC inverter 103 and is applied to the ring demodulator at a pair of terminals 126 and 127, the latter of which may comprise a sliding contact on a potentiometer. The particular form of the ring demodulator 125 is entirely conventional and a detailed description of its structure is therefore deemed unnecessary. The function of the demodulator 125 is to convert the AC output signal appearing across the secondary windings of the transformer 118 into a demodulated DC signal proportional to the magnitude and phase of the input AC signal. This demodulated DC output appears at a junction terminal 128 between the secondary windings 121 and 122 of the output transformer 118. The ring demodulator 125 is adjusted so that as the photocell 31 becomes darker due to greater scattering of light by condensation nuclei in the expansion chamber 4, the DC demodulated signal appearing at the terminal 128 becomes more positive. A capacitor 129 is connected between the terminal 128 and ground and thereby becomes more positively charged as more light is scattered in the expansion chamber 4. The signal appearing across the capacitor 129 is coupled to the input base electrode of an emitter follower transistor 130, the collector electrode of which is connected to the 12 volt supply. The function of the emitter follower transistor 130 is to transform the impedance from a relatively high level to a relatively low level for a purpose which will become apparent.

The output electrode of the transistor 130 is connected to a terminal 131 of the double throw switch 34. When the switch 34 is in its position 1 the terminal 131 is electrically connected to a terminal 132, and when it is in its position 2 the terminal 131 is connected to a terminal 133. The terminal 132 is connected to a junction terminal 134 which is connected to a capacitor 135 and to the input base electrode of a transistor 136. The capacitor 135 is connected to ground and, due to the low output impedance of the emitter follower transistor 130, is quite responsive to changes in the DC signal appearing across the capacitor 129. In addition, the capacitor 135 provides a ripple filtering function to eliminate any AC components in the output of the ring demodulator 125. Thus, when the switch 34 is in its position 1, a positive DC signal indicating the degree of light attenuation in the expansion chamber 4 appears across the capacitor 135. The signal across the capacitor 135 is applied to a second two stage amplifier comprised by a transistor 136 and transistor 137, the combination serving to transform the impedance back up to a relatively high level in order to increase the power level. The collector electrodes of the transistors 136 and 137 are connected to the 12 volt power supply and the emitter electrode output of the transistor 137 is connected to a terminal 138. A filter capacitor 139 connects the terminal 138 to ground. An emitter resistor 140 for the transistor 137 is connected between the terminal 138 and a source of negative voltage at terminal 141. A convenient source of this negative voltage at terminal 141 will be described hereinafter; however, it should be understood that any source of negative power such as a battery may be utilized. The magnitude of this negative voltage is also not critical to applicant's invention, however, in a preferred embodiment the magnitude was chosen to be approximately −5 volts.

The signal appearing at the terminal 138 is then applied through a dropping resistor 142 to a current indicating meter 143 connected in series therewith.

When the switch 34 is in its position 2, the terminal 131 is connected via the terminal 133 to an input filtering and stabilizing network 144, the output of which is connected to a terminal 145. The terminal 145 is connected to the base input electrode of a transistor 146, the collector electrode of which is connected to the 12 volt power supply. The emitter electrode of the transistor 146 is connected to a junction terminal 147 and then through an emitter resistor 148 to the negative source voltage at terminal 141. The negative terminal of the meter 143 is connected to the terminal 147 to complete the circuit for the meter. The transistor 146 holds the terminal 147, and therefore the negative side of the meter 143, at a fixed negative voltage to provide a zero set for the meter.

The signal appearing at the terminal 145 also is applied to a series of three cascaded transistors 149, 150, and 151, the function of which is to increase the impedance and therefore the current level thereof. The collector electrodes of the transistors 149 and 150 are connected to the 12 volt power supply. The emitter electrode of the transistor 151 is connected to a pair of series connected diodes 152 and 153 to the terminal 141. Diodes 152 and 153 are used to provide a relatively constant bias to the emitter of 151, and also function as a convenient voltage source for a small lamp which serves as a pilot light and also illuminates the output instrument 143 for night use. The collector electrode of the transistor 151 is connected through the lamp 30 in the expansion chamber 4 to ground. The −5 volts is obtained from a second low voltage winding on the DC-AC inverter, and two diodes.

In the operation of the circuit depicted in FIGURE 3 when the switch 34 is in its position 1, during the expansion portion of the flow cycle of FIGURE 1, the degree of attenuation of light in the expansion chamber 4 is transformed into a positive going signal appearing across the capacitor 129. This signal is transferred through the switch 34 to the capacitor 135 and, due to the fact that the emitter-follower transistor 130 has transformed the impedance to a low level, the capacitor 135 is able to respond to changes in this signal very quickly. In addition, due to the fact that the input impedance to the transistors 136 and 137 is relatively high, the capacitor 135 holds its charge for a relatively long period of time. This enables the capacitor 135 to perform a memory function, i.e., it remembers the signal and therefore the degree of attenuation of light in the expansion chamber 4 after the expansion portion of the cycle is completed and the signal is removed. The switch 34 is linked to the motor 29 (FIGURE 1) such that it switches from its position 1 to its position 2 at precisely the instant of time in which a peak number of condensation nuclei appear in the expansion chamber 4. Thus, the capacitor 135 remembers the peak reading of each expansion portion of the cycle. This peak reading is translated into a proportional current which is read by the indicating meter 143. Since the negative side of the meter 143 is kept at a fixed voltage, the meter provides a continuous indication of changes in peak levels of condensation nuclei in the expansion chamber 4.

Various factors occurring in the circuit, and especially in the expansion chamber 4, may tend to unbalance the bridge circuit comprising the two sections of the secondary winding 104, the resistor 106, and the photocell 31. Some of these factors may be changes in temperature level and various changes in the reflectivity of the inside surface of the expansion chamber 4. If these factors were left uncompensated, continuity of successive readings of the meter 143 would be lost. In order to keep the bridge balanced for each successive reading, the intensity of the lamp 30 is varied prior to each expansion portion of the cycle. For this purpose, when the switch 34 is in its position 2, the signal output of the ring demodulator 125 is fed back to the lamp 30 through the transistor 151. Thus, should factors other than nuclei count tend to darken the photocell 31 to create an unbalance of the bridge and therefore a spurious signal at the output terminal 109, this signal is utilized to compensate for such extraneous effects by increasing the current flow to the lamp 30 thereby increasing its intenstiy and bringing the bridge circuit back into balance.

The circuit thus described is especially suited for use in a portable condensation nuclei detector inasmuch as a single capacitor functions to provide quick response with very low ripple. Additionally, the storage capacity of the capacitor enables continuous monitoring of the peak of condensation nuclei occurring in the expansion chamber 4.

Referring now to FIGURES 4 and 5 two sections of a specific embodiment of the valving means 25 are shown. The specific embodiment herein described comprises a rotary disc valve including a rotating disc member and a stationary plate. FIGURE 4 illustrates the rotating disc portion 203 and FIGURE 5 illustrates the stationary plate portion 202. The rotating disc 203 is adapted to be positioned through a central hole 204 on a shaft which may be mechanically linked to a source of rotary power such as a motor. The stationary plate member 202 has a hole 205 centrally disposed therein so that it may be positioned on the same shaft as the rotating disc 203. The rotating disc 203 is positioned on the stationary plate member 202 so that its surface illustrated in FIGURE 4 is adjacent the surface of the stationary plate member illustrated in FIGURE 5.

As illustrated in FIGURE 4 the rotating disc 203 includes a plurality of circular slots or grooves positioned at various radii from the center of the disc and extending for various arc lengths.

As illustrated in FIGURE 5 the stationary plate member 204 has positioned thereon a plurality of holes which interconnect with passages 3, 5, 7, 8, 9, 26 of FIGURE 1. These holes are also positioned at various radii from the center of the stationary plate and are at suitable angular positions with respect to each other. At any given instant of time, one of the circular grooves in the rotating disc 203 may interconnect two of the holes in the stationary plate 202 so that communication between two or more of these holes is effected for the periods indicated by the cycling diagram shown in FIGURE 2. At this same instant of time some of the other holes are not interconnected so that communication between them is blocked. It will be apparent that as the rotating disc 203 rotates in synchronism with its motor power supply, the various holes in the stationary plate sequentially connect and disconnect in a predetermined sequence and at a predetermined cycling rate. By suitably positioning the circular arcs on the rotating disc as shown in FIGURE 4 and by suitably locating the various holes as shown in FIGURE 5, the flow cycle of FIGURE 2 may be effected.

Thus, in FIGURE 4 an arcuate groove 206 in the disc 203 together with the holes 207 and 208 in the stationary 202 comprise the valve A connecting the humidifier 2 to the expansion chamber 4. Similarly the arcuate slot 209 in the rotating disc 203 together with the hole 208 and another hole 210 in the stationary plate comprise the valve B connecting the expansion chamber 4 to a source of ambient air. In a like manner the groove 211 together with holes 212 and 213 comprise the valve C which connects the expansion chamber 4 to the vacuum regulator 15. The arcuate groove 214 together with the holes 213 and 215 comprise the valve D which connects the expansion chamber 4 to the vacuum regulator bleed line 26. And finally, the arcuate groove 216 together with the holes 210 and 215 comprise the valve E which connects ambient air with the vacuum regular bleed line 26.

The structural organization and operation of a rotary valve of the type just described is well known in the art and thus a further description of it is deemed unnecessary. It has been found that when cylindrical valves are used very close tolerance fits between an inner and an outer cylinder are required. I have found a means whereby the application of the rotary disc valve in a condensation nuclei detector eliminates the problems of keeping very close tolerances. To this end, I provide a very thin width groove 217 around the outside of the rotating disc 203, the entire 360° of its periphery. A very small diameter hole 218 is provided in the stationary plate member 202 at such radius that when the rotating disc 203 is in place, the hole 218 lines up with the circular groove 217. The hole 218 is connected to the vacuum regulator 15 so that a low pressure is maintained around the entire periphery of the disc 203 in the groove 217. This ring serves as a guard ring for the rotary valve and functions to minimize leakage of ambient air. In this manner very close tolerance fits between the two major portions of the rotary valve are not necessary.

The proper choice of material for the rotary valve should be such that a relatively low resistance to friction and corrosion from acid vapors is maintained. To this end I have chosen, in a preferred embodiment, a material comprising glass-filled Teflon for the rotating disc. However, this choice of material is only a preferred embodiment of the invention and the invention should not be limited thereto.

Referring now to FIGURES 6 and 7 there is shown a top view and side view respectively of a humidifier according to the teachings of the present invention. In FIGURE 7 the humidifier is shown comprising an enclosure 400 including an interior vessel 401 adapted to contain a reservoir of water. A pedestal 402 is secured to the upper interior central surface of the enclosure 400 and is suspended into the interior of the enclosure approximately to its central or middle portion. The conduit 1 shown in FIGURE 1 extends into and out of the humidifier 2 by means of an inlet tube 403 and an outlet tube 404. From the top view shown in FIGURE 6 it is apparent that both the inlet and outlet tubes 403 and 404 extend into the humidifier 2 at such a position that they are totally embedded within the suspended pedestal 402. By providing a suitable water seal between the pedestal 402 and the upper surface of the enclosure 400 and the interior vessel 401, the inlet and outlet tubes 403 and 404 can be effectively sealed off from any water in the reservoir within the humidifier. A filler cap 405 is shown in the top view of FIGURE 6 and is adapted to be removed so that the reservoir of water within the interior vessel 401 may be maintained. As will become apparent hereinafter it is only necessary to fill the interior vessel 401 with water to a level of approximately one centimeter. Thus, a great savings in weight is obtained over a humidifier design requiring a greater quantity of water.

Mounted on the bottom portion of the pedestal 402 and suspended further into the interior of the enclosure 400 is a block of porous material 406 which may comprise, for example, sintered stainless steel or perhaps Dacron. The essential property which the material 406 must possess is that it must be able to absorb a great quantity of water like a sponge. As shown in the side view of FIGURE 7, the inlet and outlet tubes 403 and 404 extend into the sintered material 406 and are connected together by means of a zig zag air passageway 407. Since the air passage 407 comprises a plurality of zig zagging passageways, the total area of the sintered material 406 exposed to the air passageway 407 is maximized.

A first loop of capillary material 408 is shown in FIGURE 7 secured to the upper portion of the pedestal 402 and along the lower surface of the porous material 406. A second loop of capillary material 409 is shown adjacent the lower surface of the interior vessel 401 and adjacent the portion of the loop 408 adjacent the porous material 406. The loops 408 and 409 are held against the porous material 406 by means of a suitable plate 410, for example aluminum, and also by means of a pair of screws 411 and 412. The loops 408 and 409 may comprise any suitable capillary material such as a Dacron or felt wick so that they possess the property of transporting water along their length either against or with the force of gravity. Both the loops 408 and 409 are fairly flexible and are of such length that no matter what the position relative to gravity that the chamber 400 may be in, a portion of at least one of the loops 408 or 409 hangs relatively near the interior surface of the lowermost portion of the interior vessel 401. When the interior vessel 401 contains a water reservoir, at least one of the loops of capillary material 408 or 409 will float on the surface of this water no matter what position that the humidifier may be in. Thus, for example, should the force of gravity be downward in FIGURE 7, the lower portion of the loop 409 will float on the surface of the water reservoir. If, however, the humidifier should be turned on its side so that the force of gravity is toward the left as shown in FIGURE 7, both the left hand portions of the loops 408 and 409 will float on the surface of the water reservoir.

In the operation of the humidifier shown in FIGURES 6 and 7, air flowing into the inlet tube 403 and out of the tube 404 must flow through the plurality of air passages 407 in the porous material 406. The capillary tubes 408 and 409 transport water from the water reservoir to the porous material 406 so that the surfaces of the air passage 407 are constantly maintained wet. Due to the maximized surface area of the air passage 407, a great deal of water vapor evaporates from the surface of the air passage 407 into the air flowing through the humidifier. In this manner dry air entering the inlet tube 403 is completely humidified by the time it emerges from the outlet passage 404. It is apparent that by means of this humidifier, the operation is not effected in any manner by the humidifier being jostled around in any one of a number of possible positions. In addition the disclosed humidifier is completely spill proof in that the chamber housing the water reservoir is completely enclosed and sealed.

Referring now to FIGURE 8 there is shown an illustration of a simplified arrangement of the various components of the condensation nuclei detector into a portable container. In FIGURE 8 the cover that would ordinarily protect the components of the detector is removed so that the internal components may be viewed. A casing 300 includes, in its upper left hand corner, an inlet tube 301 which connects ambient atmosphere to the humidifier 2. From the humidifier the flow path of air goes to the valving means 25 positioned in the upper central portion of the casing 300. The valving means 25 may comprise a rotary valve including a lower stationary plate member 202 and an upper rotating disc member 203. As shown in FIGURE 1 it will be apparent that the inlet conduit 301 actually comprises a pair of conduits connecting ambient air to the expansion chamber, one passing through the humidifier 2 and another bypassing the humidifier; however, for simplicity sake only the single conduit 301 is shown in FIGURE 8, The rotary valve 25 is connected to the expansion chamber 4 which is positioned vertically in the central front portion of the portable casing 300. The upper end of the expansion chamber 4 comprises a housing 302 which is adapted to contain the lamp 30. At the right hand portion of the rotary valve 25 a conduit extends into the vacuum regulator 15. The vacuum regulator 15 is connected to the vacuum pump 20 by means of the conduit 21. The vacuum regulator 15 is also connected to ambient air by means of the bellows pressure reference conduit 19. The vacuum pump 20 is connected by means of conduit 22 to a muffler 23 which, by means of an exhaust pipe 24, is connected to the exterior of the casing 300.

A pair of batteries 100 are positioned in the lower part of the casing 300 on either side of the long thin expansion chamber 4. These batteries are connected by means of electric circuitry (not shown) to the electric control circuit 32 positioned to the left of the expansion chamber 4 and near the central portion of the casing 300. The electric pump-motor combination 20 and 29 is also connected by means of electric circuitry (not shown) to the batteries 100. The motor is mechanically linked by means of a gearing arrangement 303 to a gear 304. The gear 304 is connected by means of a shaft 305 (shown in dotted outline form) to the rotary valve 25 and specifically to the rotating disc 203.

The electric circuit 32 is connected to the switch 34 by electric circuitry (not shown) and is mechanically linked to the rotary valve 25 so that it may operate at predetermined times in the cycle. At the bottom end of the expansion chamber 4 there is placed a casing 307 containing the photocell 31. The photocell 31 is connected in circuit relationship with the electric circuit 32 by means of electric circuitry (not shown).

Although not illustrated in this drawing, the cover portion for the casing 300 may contain control dials and switches and indicating by means by which the user may monitor the atmospheric conditions sensed by the condensation nuclei detector. Although FIGURE 8 shows a convenient arrangement by which the various essential elements of this invention may be assembled in a portable casing, applicant does not intend to be limited to this particular arrangement since many modifications in this arrangement will be apparent to those skilled in the art.

In FIGURE 8 it is apparent that the expansion chamber 4 comprises a tube with a light source 30 at one end and a photocell 31 at the opposite end. The interior surface of the expansion chamber tube 4 is polished so that light from the source 30 is reflected a multiple number of times as it travels down the length of the tube. In this manner optics such as lenses and special reflectors are not necessary as in previous arrangements. Also the great majority of the light emanating from the source 30 eventually reaches the photocell 31 so that no photomultiplying device is necessary as with other types of expansion chambers previously used. By the elimination of very highly sensitive photomultiplying devices, the expansion chamber of this invention is adapted to be balanced between each reading by the very simple technique as described with respect to the electric circuit 32 of FIGURE 3.

The expansion chamber of this invention utilizes the principle of attenuation of a light beam to a photocell due to light scattering by the water droplets formed around the condensation nuclei within an air sample. This is different from the light scattering technique utilized in previous condensation nuclei detectors wherein the light scattering occasioned by the water droplets in the expansion chamber causes light impingement on the photocell to produce the output measurement signal. The use of the attenuation principle rather than a light scattering principle allows for the elimination of special dark field optical systems and greatly simplifies the design of the condensation nuclei detector.

The interior surface of the expansion chamber 4 is flushed with ambient air after every expansion portion of the cycle so that the interior walls are dry. In many previous expansion chambers the interior walls remained wet throughout the cycle. Because the expansion chamber of this invention does not have a wet interior lining, the condensation nuclei water droplets formed during the expansion portion of the cycle reach a peak very rapidly and then begin to evaporate so that the resulting signal is a fairly sharp pulse. In one embodiment a pulse of about 0.05 second in width was achieved. The amplitude of this pulse output has proven to be a linear function of the nuclei concentration within the gas sample at least up to a total concentration of 100,000 nuclei per cubic centimeter. The linear output achieved by means of this expansion chamber greatly simplifies the electric readout circuitry.

Since the volume of the expansion chamber 4 is relatively small as compared to previous expansion chambers, the pump required to fill and flush the expansion chamber at the desired cycle rate may be relatively small. In one preferred embodiment, at a cycling rate of once per second, a pump capacity of twenty cubic centimeters per second at a vacuum in the vacuum regulator of eight inches of mercury was found to be entirely suitable. Thus the use of a relatively small pump enables the utilization of a smaller power supply and therefore smaller batteries than would be possible if prior expansion chambers should be utilized.

Since the expansion chamber 4 uses a very simple principle of measuring light transmission, it is possible to decrease the physical length of the expansion chamber by employing a "folded" tube, if desired. This would comprise a long thin tube with a plurality of folds and interior reflecting means at each fold to that the light may turn the corners and eventually travel from the light source to the photocell. In this manner it may be possible to construct an even smaller condensation nuclei detector than one employing the long thin expansion chamber as illustrated in FIGURE 8.

In summary, the expansion chamber 4 provides the advantages of very simple optics and simple photocell pickup while at the same time enabling the utilization of a smaller power supply than was the case in prior expansion chambers.

Various modifications of the condensation nuclei detector disclosed will be apparent to those skilled in the art. It is therefore not intended to be limited to the specific embodiment disclosed.

What I claim as new and desire to be secured by Letters Patent of the United States is:

1. In a condensation nuclei measuring apparatus, the combination comprising a first chamber adapted to hold nuclei bearing gaseous samples and including an inlet and an outlet opening, means for humidifying said samples, first input means connected to said inlet opening through which the nuclei bearing humidified gaseous samples are introduced into said chamber, second input means connected to said inlet opening in parallel with said first means for introducing non-nuclei bearing gas into said chamber, regulating means for subjecting the nuclei bearing humidified gaseous samples in said chamber to a periodic expansion, means blocking said second input means and opening said first input means during a period prior to each expansion period, means blocking said first input means and opening said second input means during periods subsequent to each expansion period, and means to measure the density of the droplet clouds formed by the expansion of said samples.

2. In a condensation nuclei measuring apparatus, the combination comprising a first chamber adapted to hold nuclei bearing gaseous samples and including an inlet and an outlet opening, a humidifier for humidifying a gaseous sample containing nuclei, a first conduit connecting said inlet opening to said humidifier through which nuclei bearing humidified gaseous samples are introduced into said chamber, a second conduit connected to said inlet opening for introducing non-nuclei bearing gas into said chamber, vacuum regulating means connected to said outlet opening for subjecting the nuclei bearing gaseous samples in said chamber to a periodic vacuum defined expansion, valving means for closing said second conduit and opening said first conduit during a period prior to each expansion period, said valving means closing said first conduit during expansion periods, said valving means further closing said first conduit and opening said second conduit during periods subsequent to each expansion period, and means to measure the density of droplet clouds formed by the expansion of said humidified samples.

3. In a condensation nuclei measuring apparatus, the combination comprising a first chamber adapted to hold nuclei bearing gaseous samples and including an inlet and an outlet opening, a humidifier for humidifying nuclei bearing gaseous samples, a first conduit connecting said humidifier to said inlet opening through which the nuclei bearing humidified gaseous samples are introduced into said chamber, a second conduit connecting said inlet opening to a source of ambient air, vacuum regulating means for subjecting the nuclei bearing humidified gaseous samples in said chamber to a periodic vacuum defined expansion, a third conduit connecting said outlet opening to said vacuum regulating means, a fourth conduit connecting said outlet opening to a vacuum bleed line for said vacuum regulating means, a fifth conduit for connecting said source of ambient air to said vacuum regulator bleed line, valving means, said valving means opening said first and said fourth conduits while closing said second, third, and fifth conduits during a first period of a cycle, said valving means closing said first and fourth conduits while opening said fifth conduit during a second period of said cycle, said valving means opening said second and fourth conduits while closing said third and fifth conduits during a fourth and final period of said cycle, and means to measure the density of droplet clouds formed by expansion of the nuclei bearing humidified gaseous sample during said third period of said cycle.

4. In a condensation nuclei detector the combination comprising, an expansion chamber including inlet and outlet openings, means for introducing humidified nuclei bearing gaseous samples through said inlet opening, means for periodically expanding said gaseous samples to cause the formation of a water cloud therein, a light source positioned in said expansion chamber, a light sensitive element positioned opposite said light source within said expansion chamber, an electric control circuit connected to said light sensitive element, said control circuit including output reading means for providing a reading proportional to the least amount of light falling on said light sensitive element and therefore the peak concentration nuclei in said expansion chamber during periods of expansion, and means for storing each successive peak reading, said output reading means being responsive to each of said successive stored peak readings.

5. The condensation nuclei detector as defined in claim 9 and further including means for providing a negative feedback to said light source during non-expansion periods in said expansion chamber in order to vary its light output in a manner such that said electrical control circuit is adjusted to a predetermined condition prior to each successive expansion period.

6. The condensation nuclei detector as defined in claim 5 and further including a two position electrical switch, said first position connecting said light sensitive resistance to said output reading means during periods of expansion and said second position connecting said light sensitive resistance to said feedback means during periods of non-expansion in said expansion chamber.

7. In a condensation nuclei measuring apparatus, the combination comprising, (a) an expansion chamber adapted to hold nuclei bearing humidified gaseous samples and including an inlet and an outlet opening, said expansion chamber comprising,
   (1) a hollow tubular member of relatively small diameter, said inlet opening being positioned at one end of said tubular member and said outlet opening being positioned at the opposite end of said tubular member, said tubular member may include polished inside surfaces,
   (2) a source of light at one end of said tubular member,
   (3) a light sensitive resistance connected at the opposite end of said tubular member,
(b) a gas humidifier comprising,
   (1) an enclosed vessel adapted to contain a reservoir of water in any position of said vessel,
   (2) a porous substance supported within said vessel but out of said water reservoir in said vessel in any position thereof, said porous substance including a passageway,
   (3) an inlet and an outlet opening in said vessel, said openings connecting by means of said passageway to define an enclosed gas-flow path therethrough,
   (4) a plurality of flexible loops connecting said porous substance with said water reservoir in said vessel, said loops being of such a length that the lowest portion of at least one loop in every possible position of said vessel, as determined by the force of gravity, is in contact with said water reservoir, said loops being adapted to transport water from said reservoir to said porous substance to humidify a gaseous sample flowing through said passageway,
(c) a first conduit connecting said outlet opening of said humidifier to said inlet opening of said extension chamber through which the nuclei bearing humidified gaseous samples are introduced into said expansion chamber, a second conduit connecting said inlet opening of said expansion chamber to a source of ambient air,
(d) vacuum regulating means for subjecting the nuclei bearing humidified gaseous samples in said chamber to a periodic vacuum defined expansion, a third conduit connecting said outlet opening of said expansion chamber to said vacuum regulating means, a fourth conduit connecting said outlet opening to a vacuum bleed line for said vacuum regulating means, a fifth conduit connecting said source of ambient air to the vacuum regulating bleed line,
(e) a rotary disc valve,
   (1) said valve opening said first and fourth conduits while closing said second, third, and fifth conduits during a first period of a cycle,
   (2) said rotary valve closing said first and said fourth conduits while opening said fifth conduit during a second period of said cycle,
   (3) said rotary valve opening said third conduit during a third period of said cycle,
   (4) said rotary valve opening said second and said fourth conduits while closing said third and fifth conduits during a fourth and final period of said cycle, said rotary disc valve including a 360° circular groove on the outer periphery of said disc, said groove being connected to said vacuum regulator to maintain a relative vacuum therein,
(f) an electric control circuit connected to said light sensitive resistance and including,
   (1) a negative feedback circuit connected to said light source, said control circuit further including,
   (2) output means for providing an output reading proportional to the attenuation of light impinging on said light sensitive resistance and therefore the peak concentration of condensation nuclei in said expansion chamber during periods of expansion,
   (3) a capacitor connected in said control circuit and to said output reading means for storing each successive peak reading, said output reading means being of a high input impedance relative to said capacitor to increase the response time thereof,
   (4) a two position electrical switch,
(a) said first position connecting said light sensitive resistance to said capacitor and said output reading means during periods of expansion to obtain output readings,
(b) said second position connecting said light sensitive resistance to said feedback circuit during periods of non-expansion such that said electrical control circuit is adjusted to a predetermined condition prior to each successive expansion period, said two-position switch being operable to switch from said first position to said second position at the instant of peak concentration of condensation nuclei in said expansion chamber.

References Cited

UNITED STATES PATENTS

| | | | |
|---|---|---|---|
| 171,751 | 1/1876 | Wiggin | 261—99 |
| 892,241 | 6/1908 | Freise | 250—218 X |
| 1,367,701 | 2/1921 | Haynes | 261—104 |
| 1,968,816 | 8/1934 | Corbett et al. | |
| 2,212,211 | 8/1940 | Pfund | 250—43.5 |
| 2,227,117 | 12/1940 | Woodson. | |
| 2,407,838 | 9/1946 | Kliever | 250—218 X |
| 2,422,766 | 6/1947 | Alexander | 171—95 |
| 2,603,468 | 7/1952 | Sutton | 261—99 |

(Other references on following page)

UNITED STATES PATENTS

| | | |
|---|---|---|
| 2,684,008 | 7/1954 | Vonnegut. |
| 3,041,916 | 7/1962 | Clavé et al. _____ 350—301 X |
| 3,010,308 | 11/1961 | Skala. |
| 3,246,667 | 4/1966 | Pemberton _____ 137—312 |
| 2,791,901 | 5/1957 | Rich. |
| 3,037,421 | 6/1962 | Bigelow et al. |

OTHER REFERENCES

"The Use of A Kaleidoscope to Obtain Uniform Flux . . . Furnace," Chen et al., app. optics, 2 (3), 265–271, March 1963.

"Cone Channel Condenser Optics," D. E. Williamson, J.O.S.A. 42 (10), 712, October 1952.

"Cloud Chamber for Optical Measurements of Aerosols," E. Speyer, app. optics, 2, (2) 207–210, February 1963.

JEWELL H. PEDERSEN, Primary Examiner

R. J. WEBSTER, Assistant Examiner

U.S. Cl. X.R.

250—218; 261—99, 104; 350—96; 356—103